US008317369B2

(12) United States Patent
McCanless

(10) Patent No.: US 8,317,369 B2
(45) Date of Patent: Nov. 27, 2012

(54) LIGHT FIXTURE HAVING SELECTIVELY POSITIONABLE HOUSING

(75) Inventor: Forrest S. McCanless, Oxford, GA (US)

(73) Assignee: ABL IP Holding LLC, Conyers, GA (US)

( * ) Notice: Subject to any disclaimer, the term of this patent is extended or adjusted under 35 U.S.C. 154(b) by 314 days.

(21) Appl. No.: 12/798,406

(22) Filed: Apr. 2, 2010

(65) Prior Publication Data

US 2010/0254146 A1 Oct. 7, 2010

Related U.S. Application Data

(60) Provisional application No. 61/211,724, filed on Apr. 2, 2009.

(51) Int. Cl.
*B60Q 1/00* (2006.01)
(52) U.S. Cl. ........................................ 362/368; 362/373
(58) Field of Classification Search ........................ None
See application file for complete search history.

(56) References Cited

U.S. PATENT DOCUMENTS 4,935,665 A 6/1990 Murata
5,528,474 A 6/1996 Roney et al.
5,690,417 A 11/1997 Polidor et al.
5,806,969 A 9/1998 Rosengren
5,836,676 A 11/1998 Ando et al.
5,893,626 A 4/1999 Poling
6,048,080 A 4/2000 Belliveau
6,386,743 B1 5/2002 Futami et al.
6,390,643 B1 5/2002 Knight
6,454,437 B1 9/2002 Kelly
6,478,447 B2 11/2002 Yen
6,502,956 B1 1/2003 Wu
6,554,451 B1 4/2003 Keuper
6,561,690 B2 5/2003 Balestriero et al.
6,657,393 B2 12/2003 Natsume
6,692,139 B2 2/2004 Kotovsky
6,726,348 B2 4/2004 Gloisten
6,773,139 B2 8/2004 Sommers
6,843,581 B2 1/2005 Mier-Langner et al.
6,871,983 B2 3/2005 Jacob et al.
6,908,214 B2 6/2005 Luk
7,204,610 B2 4/2007 Watanabe et al.
7,226,185 B2 6/2007 Dolgin et al.
7,267,461 B2 9/2007 Kan et al.
7,278,755 B2 10/2007 Inamoto
7,284,871 B2 10/2007 Oon et al.

(Continued)

FOREIGN PATENT DOCUMENTS

CN 201155732 Y 11/2008

*Primary Examiner* — Anh Mai
*Assistant Examiner* — Britt D Hanley
(74) *Attorney, Agent, or Firm* — Kilpatrick Townsend & Stockton LLP

(57) ABSTRACT

Light fixtures including a housing that acts as a heat sink, and additionally includes structure to selectively position the light fixture at different orientations. In certain embodiments, the light fixture includes a housing, a light source, and a bracket. Set of fins may protrude from the housing, and flanges may protrude from the bracket. In use, the flanges engage ribs on the housing to support the lighting fixture. By altering the engagement between the flanges and ribs, the light fixture may be re-positioned within the bracket in a number of different orientations, creating a number of light distribution options for the light fixture.

18 Claims, 11 Drawing Sheets

U.S. PATENT DOCUMENTS 7,311,422 B1 12/2007 Chen
7,331,681 B2 2/2008 Pohlert et al.
7,405,715 B2 7/2008 Guzman et al.
7,572,027 B2 * 8/2009 Zampini et al. ............... 362/225
7,896,521 B2 3/2011 Becker et al.
2002/0044456 A1 * 4/2002 Balestriero et al. ........... 362/555
2005/0047170 A1 3/2005 Hilburger et al.
2006/0092636 A1 5/2006 Potucek et al.
2006/0291204 A1 12/2006 Marka et al.
2007/0058377 A1 3/2007 Zampini, II et al.
2007/0091602 A1 4/2007 Vader et al.
2007/0097681 A1 5/2007 Chich et al.
2007/0263408 A1 11/2007 Chua
2007/0274084 A1 * 11/2007 Kan et al. ...................... 362/373
2008/0037239 A1 2/2008 Thomas et al.
2008/0042068 A1 2/2008 Nishinaga et al.
2008/0089085 A1 4/2008 Popelek
2008/0101063 A1 5/2008 Koike et al.
2008/0106892 A1 5/2008 Griffiths et al.
2008/0137347 A1 6/2008 Trott et al.
2008/0151542 A1 6/2008 Liddle
2008/0285260 A1 11/2008 Sherman
2008/0298058 A1 12/2008 Kan et al.
2009/0037239 A1 2/2009 Wong et al.
2011/0134649 A1 6/2011 Becker

* cited by examiner

LIGHT FIXTURE HAVING SELECTIVELY POSITIONABLE HOUSING

CROSS-REFERENCE TO RELATED APPLICATIONS

This application claims the benefit of Application Ser. No. 61/211,724, filed on Apr. 2, 2009 and entitled "Light Fixture With Adjustable Heat Sink Housing," the entire contents of which are incorporated by reference.

FIELD

Embodiments of the invention relate to mounted light fixtures having several positioning options.

BACKGROUND

An important consideration in the design of light fixtures is the selection of the light source. Fluorescent lamps have long been the light source of choice in many commercial applications, particularly for indoor office lighting. These fluorescent lamps provide high lumen output, which is a favorable quality when illuminating a space. Other light sources may include electrodeless high-intensity discharge ("HID") lamps or incandescent light bulbs. Additionally, light-emitting diodes ("LED") have grown in popularity as a light source due to their high lumen output and compact size.

But such light sources (particularly, fluorescent lamps and LEDs) may produce undesirable direct lighting. "Direct lighting" means that the light is only directed into the space immediately below the light fixture, which leaves other areas of the space dark. For example, if a light fixture having a fluorescent lamp is mounted to a ceiling of a room, then the floor immediately below the light fixture may be very bright, but the upper portions of walls in the room may be dark. The use of optics may reduce some direct lighting. Optics may include lenses, shields, or other covers with refractive surfaces that refract the light and make the light more uniform in the illuminated space. But even with optics, light fixtures cannot always distribute light throughout the entire space meant to be illuminated.

Additionally, such light fixtures are typically mounted on the wall or ceiling such that a user cannot change the direction of the emitted light. For example, a light fixture may have a rectangular housing that is mounted to the ceiling with bolts or screws. If the requirements of the space change—for example, if furniture is moved in the space—then such permanently mounted fixtures cannot adapt to meet the new lighting requirements.

Finally, light sources emit thermal energy and may become very hot, thus risking damage to the light fixture. For example, a HID lamp may reach temperatures of 800° C. If the light fixture has an optic, the optic may melt or burn. The light source may become damaged or the restrike time (the time it takes for a light source to turn on after it is turned off) may become unacceptably long. It thus becomes necessary to provide systems, such as heat sinks, to reduce the temperature of the light fixture. But introducing heat sinks also increases the number of parts in the light fixture, and accordingly, the weight, manufacturing costs, etc.

Thus, there exists a need for light fixtures that may distribute light into a particular desired location.

There exists a need for light fixtures that may adapt to changing conditions within an illuminated space.

There exists a need to remove heat from the light fixture.

There exists a need to reduce the number of parts in the light fixture.

SUMMARY

Certain embodiments of the invention provide a housing for a light fixture that acts as a heat sink to remove heat from the light fixture and also provides for selective positioning of the light fixture to thereby alter the direction of emitted light within an illuminated space. Light fixtures may include a housing, a light source, and a bracket. There may a set of fins protruding from the housing and flanges protruding from the bracket. When the housing is positioned within the bracket, the fins rest on the bracket, thus suspending the housing within the bracket. The housing may be repositioned within the bracket by engaging the bracket with other fins provided on the housing. Thus, the fins allow for the housing to be positioned in a number of different orientations, creating a number of light distribution options for the light fixture.

BRIEF DESCRIPTION OF THE FIGURES

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

DETAILED DESCRIPTION

Certain embodiments of the present invention provide a light fixture 10, which includes (inter alia) a light source 134 provided on a housing 100. There may also be provided a bracket 200 to mount the light fixture 10 to a surface, such as a wall or ceiling. As described in more detail below, the housing 100 acts as a heat sink for the light source 134 and engages with the bracket 200 to allow selective positioning of the light fixture 10 to direct the light emitted by the light source 134 as desired.

Figure 1:
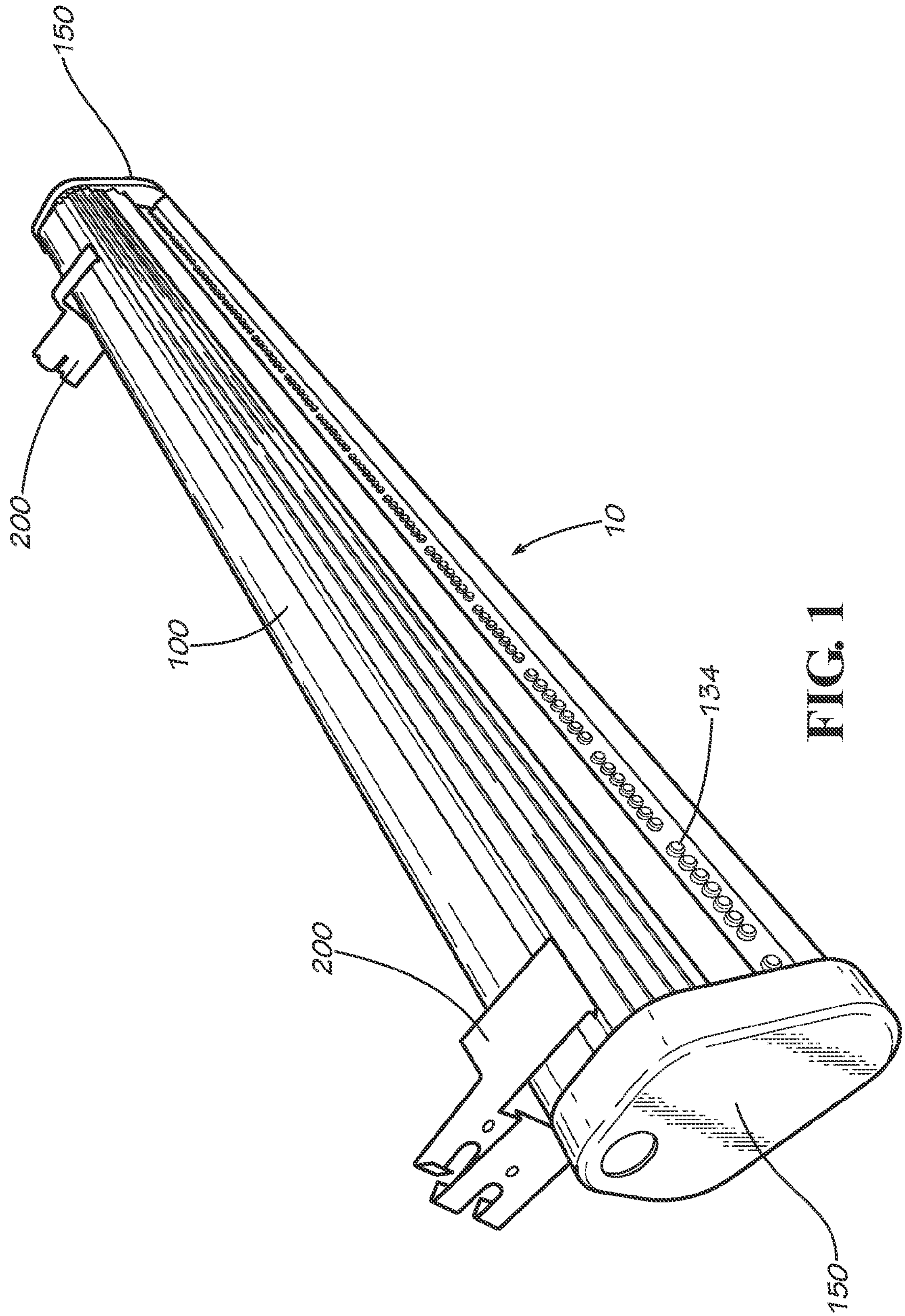
FIG. 1 is a perspective view of a light fixture according to one embodiment of this invention.
Figure 2:
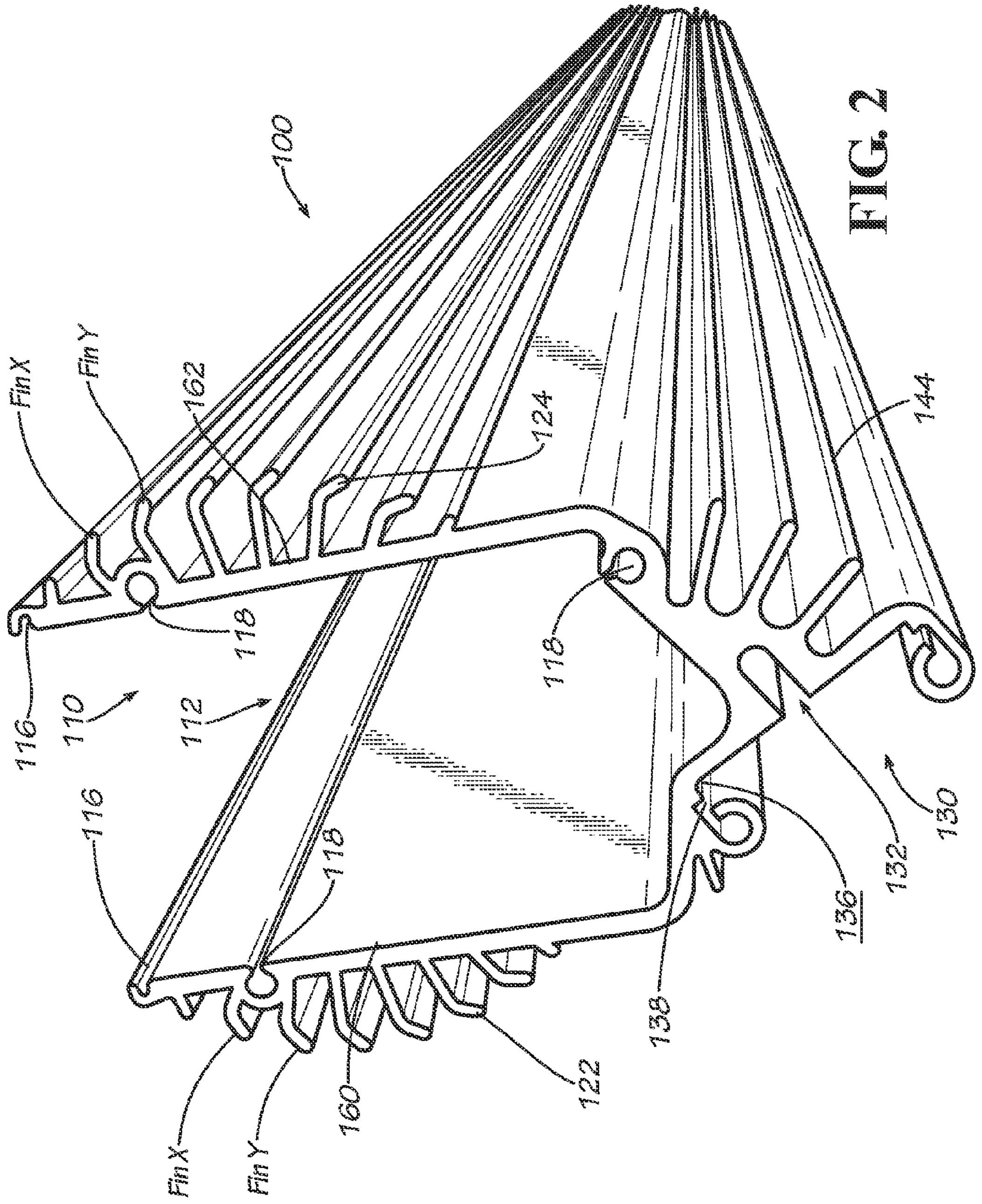
FIG. 2 is a perspective view of a housing of the light fixture of FIG. 1.
Figure 3:
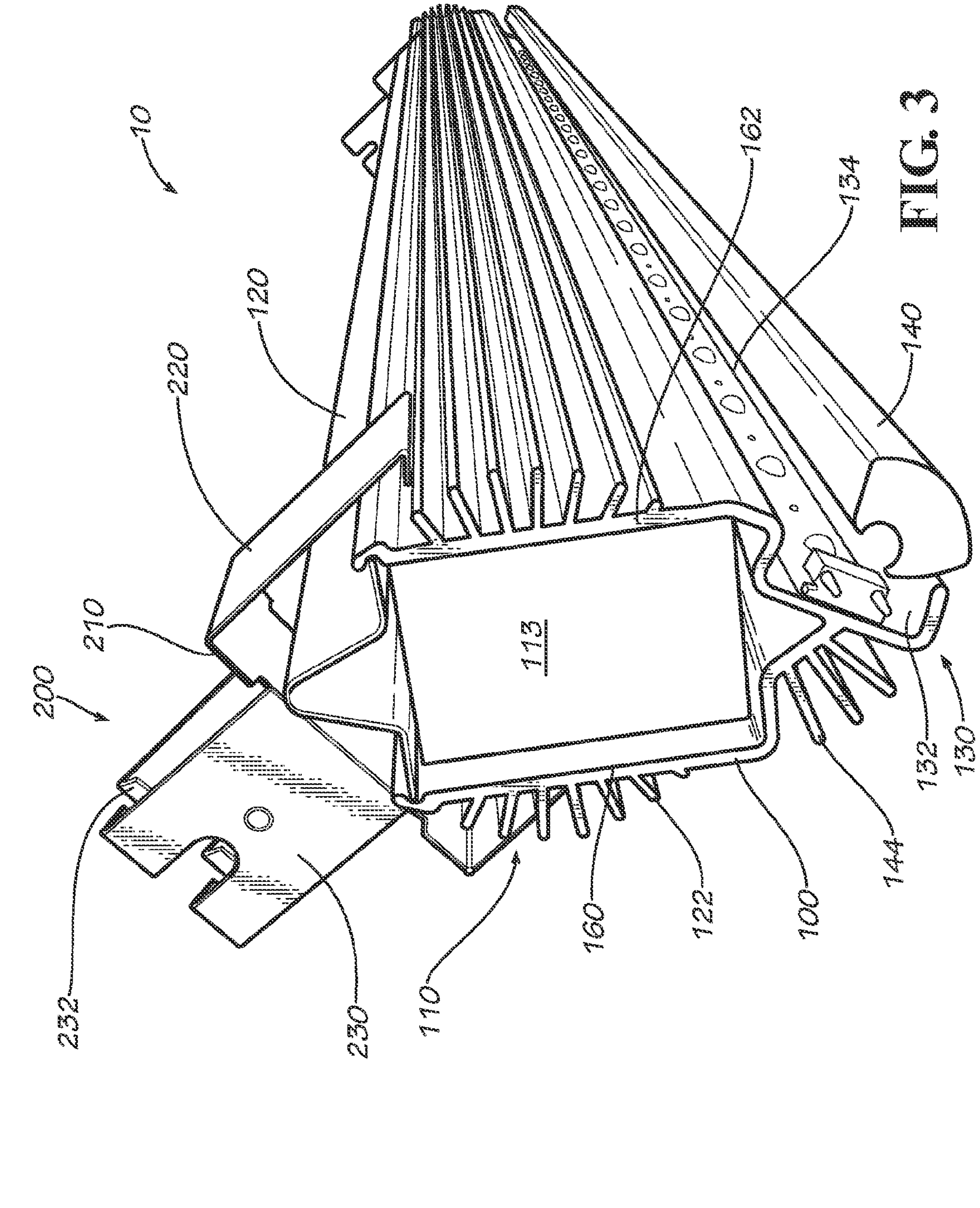
FIG. 3 is another perspective view of the light fixture of FIG. 1.
Figure 9:
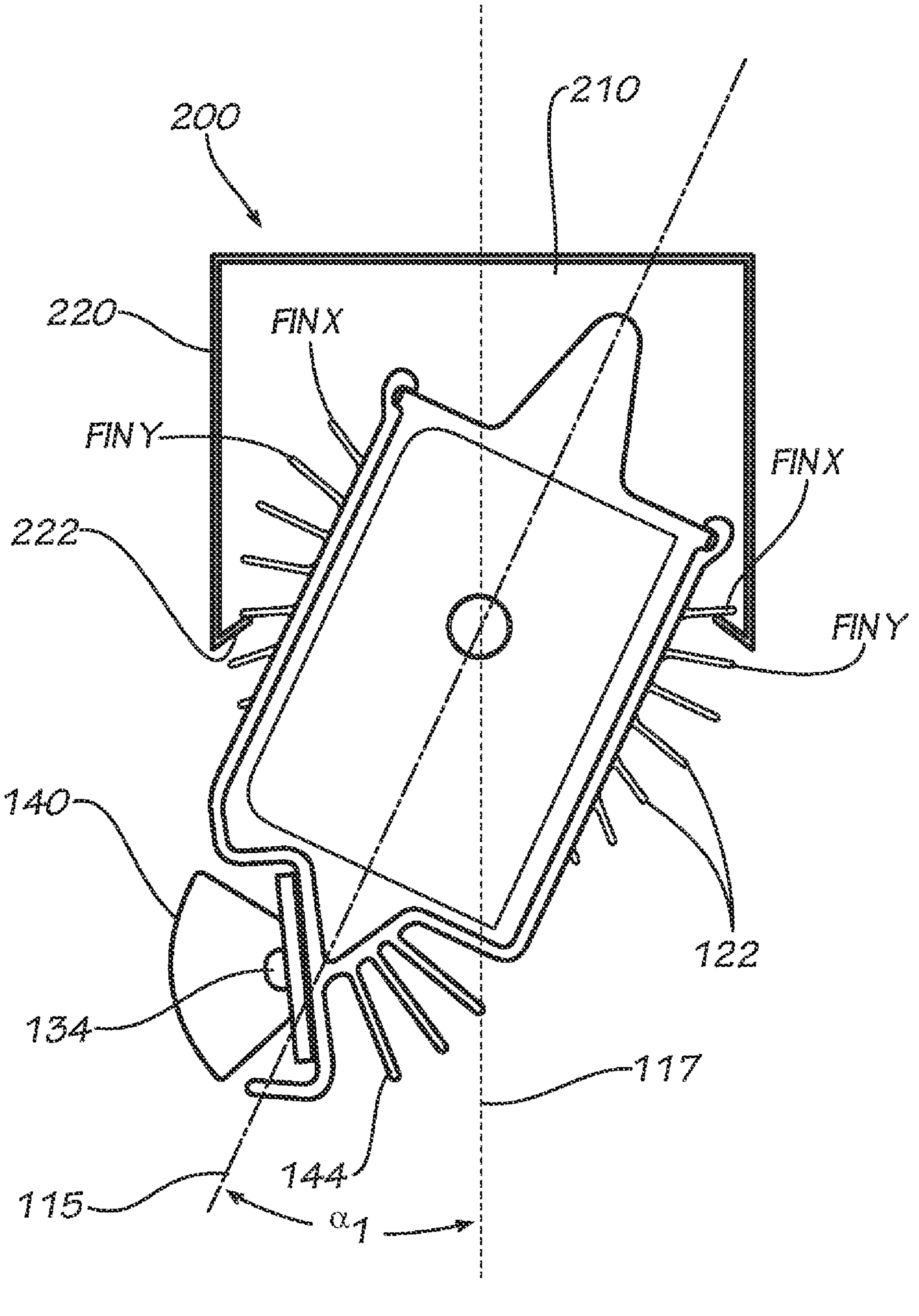
FIGS. 9-11 are cross sectional views of the light fixture of FIG. 1.
Figure 10:
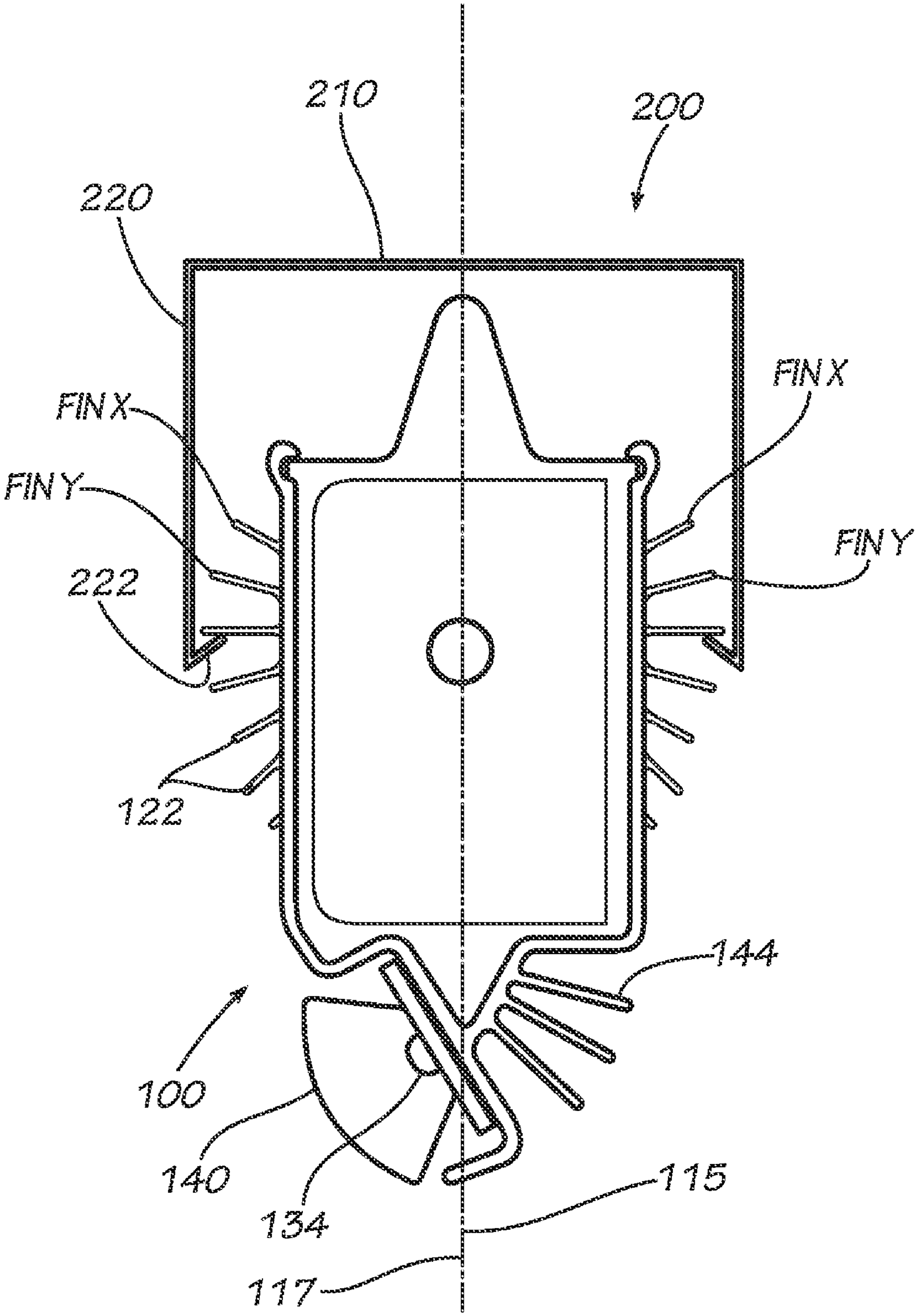
Figure 11:
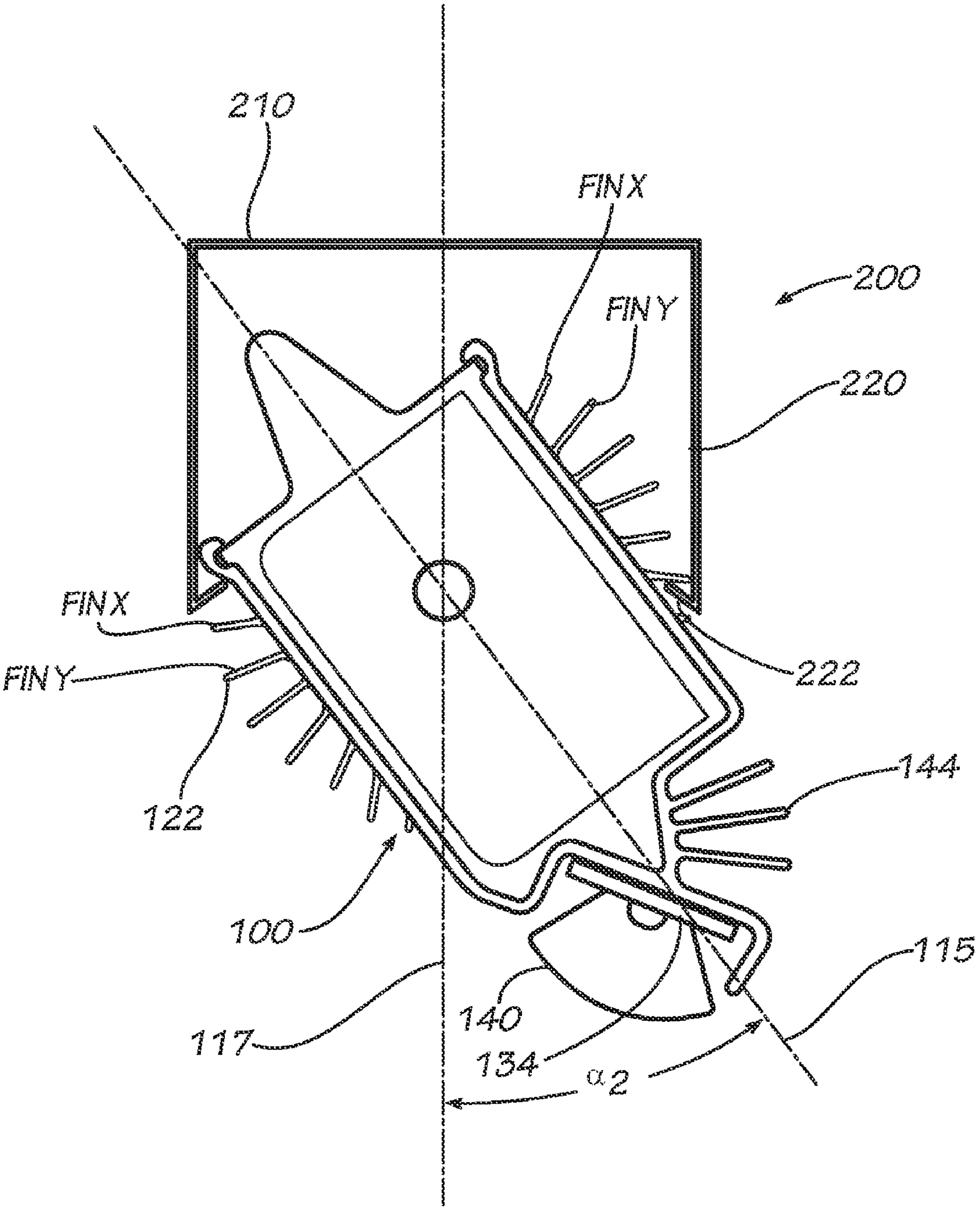

The light fixture 10 includes a housing 100. As shown in FIG. 2, the housing 100 includes an upper portion 110, a lower portion 130, a first sidewall 160, and a second sidewall 162. The upper portion 110 has an interior channel 112 (defined by the first and second sidewalls 160, 162) that may house a power source 113 for the light source 134. A center plane 115 (as shown in FIGS. 9-11) extends through the center of the interior channel 112 and along the length of the housing 100. A cover 120 may be positioned to enclose the interior channel 112. The power source 113 and/or cover 120 may be retained within and/or on the housing 100 using any mechanical or chemical retention method. In one embodiment, slots 116, 118 that extend at least partially along the length of the housing 100 are provided along the channel 112. These slots 116, 118 engage with structure on cover 120 or on the power source 113 to secure the cover 120 and/or power source 113 within the light fixture 10 (as shown in FIG. 3). The size, arrangement, and number of slots 116, 118 may vary depending on the intended application of the light fixture 10. Moreover, various other types of structures may be provided in the housing 100 to serve these functions.

In certain embodiments, the upper portion 110 of the housing 100 is provided with a number of fins 122. (If desired, the lower portion 130 of the housing 100 may also be provided with fins 144.) There may be provided fins 122 on the first sidewall 160, the second sidewalls 162, or both. In FIG. 2 there are fins 122 on each of the first and second sidewalls 160, 162 that generally correspond to one another. That is, the profile of the fins 122 on the first and second sidewalls 160, 162 generally match such that there is a fin X on both the first and second sidewalls, 160, 162. But in other embodiments, the number of (or profile of) fins 122 on the first and second sidewall 160, 162 may differ.

In certain embodiments the fins 122 are angled with respect to the sidewall 160, 162 from which they protrude. (For example, in FIG. 8, the first two fins 122 extend at angles θ1 and θ2 relative to the first sidewall 160.) The fins 122 may extend at any angle relative to the sidewall 160, 162. It may be desirable, but not required, to provide fins 122 along the first sidewall 160 that extend at angles different from the fins 122 provided along the second sidewall 162. Moreover, fins 122 that extend from a single sidewall (either 160 or 162) may extend at different angles from one another. For example, the angles θ1 and θ2 may be different from one another. In one non-limiting embodiment, the angle between a fin 122 and a sidewall (either 160 or 162) increases by approximately 12° between adjacent fins along a sidewall. For example, θ2 is 12° larger than θ1. As explained in more detail below (and as shown in FIG. 2), the tips 124 of the fins 122 may be bent with respect to the rest of the fins 122.

In certain embodiments, the lower portion 130 of the housing 100 includes structure to retain a light source 134, an optic 140, or other components for the fixture 10. For example, the lower portion 130 may include a trough 132 having an inner surface 136. A light source 134 may be received within the trough 132 such that it contacts the inner surface 136 of the trough 132. The trough 132 may have a width that is dimensioned to closely receive the light source 134 to prevent lateral movement of the light source 134 within the trough 132. The light source 134 may connect to the power source 113 through apertures (not shown) that may be provided in the lower portion 130, or may alternatively connect to the power source 113 near the caps 150 of the housing 100.

Embodiments of the light fixture 10 may be provided with various types of light sources 134, including but not limited to fluorescent lamps, electrodeless high-intensity discharge ("HID") lamps, incandescent light bulbs, or one or more light-emitting diodes ("LED"). If more than one LED is used as the light source 134, then the LEDs might be packaged together in a single luminaire. In general, any type of light source 134 is within the scope of this invention.

The light fixture 10 may optionally include an optic 140, which may be used to create volumetric lighting, to refract the light emitted from the light source 134, to provide a protective cover for the light source 134, and/or to assist in retaining the light source 134 within the light fixture 10. Optics 140 may include lenses, shields, or other covers with refractive surfaces. In embodiments having optics 140, the lower portion 130 of the housing 100 may include slots 138 that engage with flanges 142 on the optic 140, although retention of the optics 140 on the housing 100 is not limited to this particular retention method.

When the optic 140 is mounted over the light source 134, the light source 134 and/or the optic 140 may become very hot due to the heat energy released by the light source 134. Thus, in certain embodiments the housing 100 acts as a heat sink to remove heat from the light source 134 and/or the optic 140. To increase heat-transfer properties, the housing 100 may be made of a heat-conducive material, including metals such as, but not limited to, aluminum, copper, steel, and nickel. Additional heat-transfer properties are provided by the fins 122, which increases the surface area of the housing 100 and allow heat to be removed by convection. To further increase heat-transfer properties, the lower portion 130 of the housing 100 (the area most adjacent to the light source 134) may also include fins 144.

The housing 100 may be formed from an extrusion process, rendering it easy to vary the length of the housing 100. But other methods of formation may be used, such as molding or machining.

Figure 4:
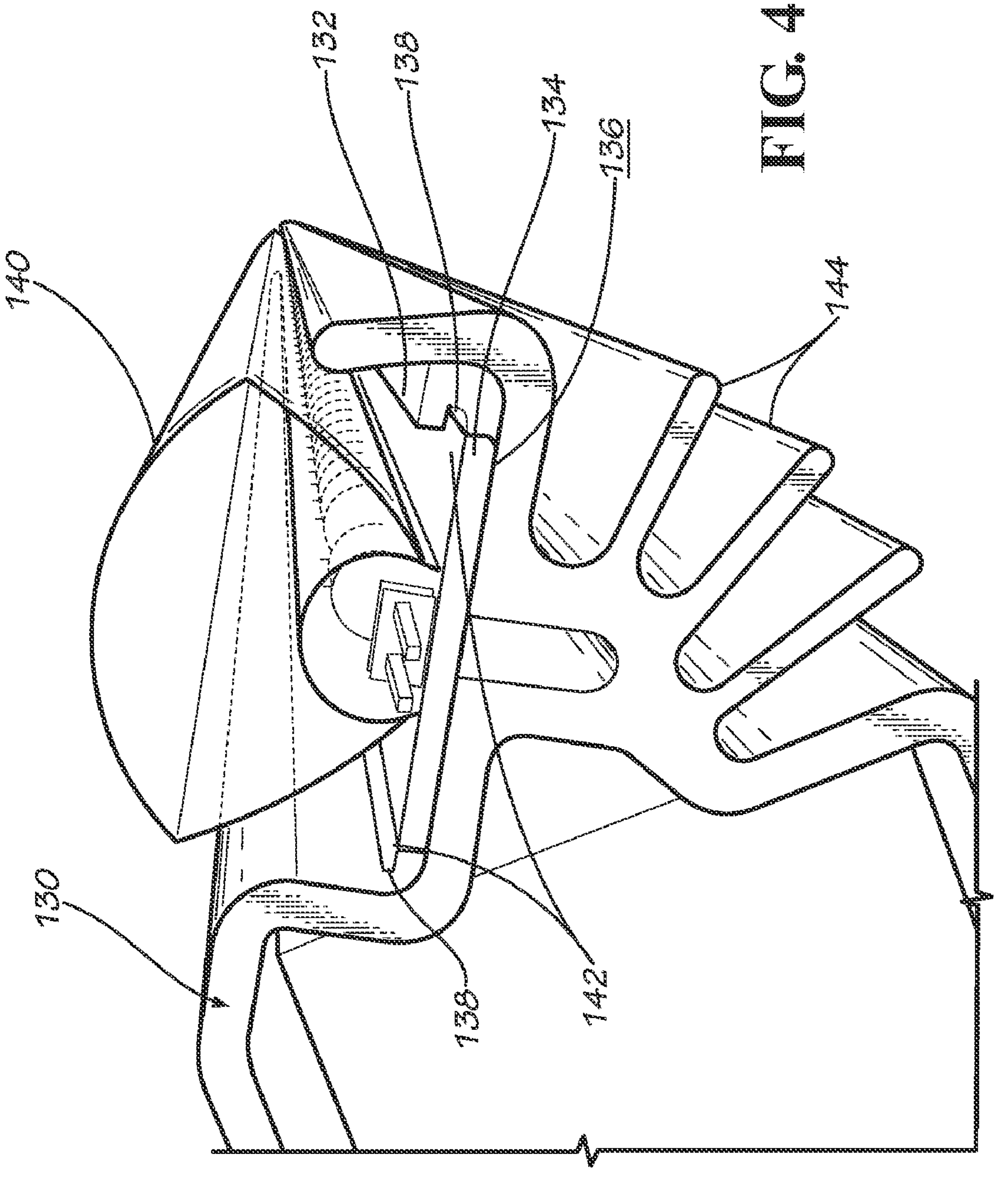
FIG. 4 is a partial perspective view of the light fixture of FIG. 1.

As shown in FIGS. 3 and 4, the lower portion 130 of the housing 100 may be, but does not have to be, oriented in a different planar direction than that of the upper portion 110. For example, a different orientation may be desired to direct light within a particular area of an illuminated space. The orientation of the lower portion 130 may differ depending upon application and the lighting requirements of the light fixture 10.

Figure 5:
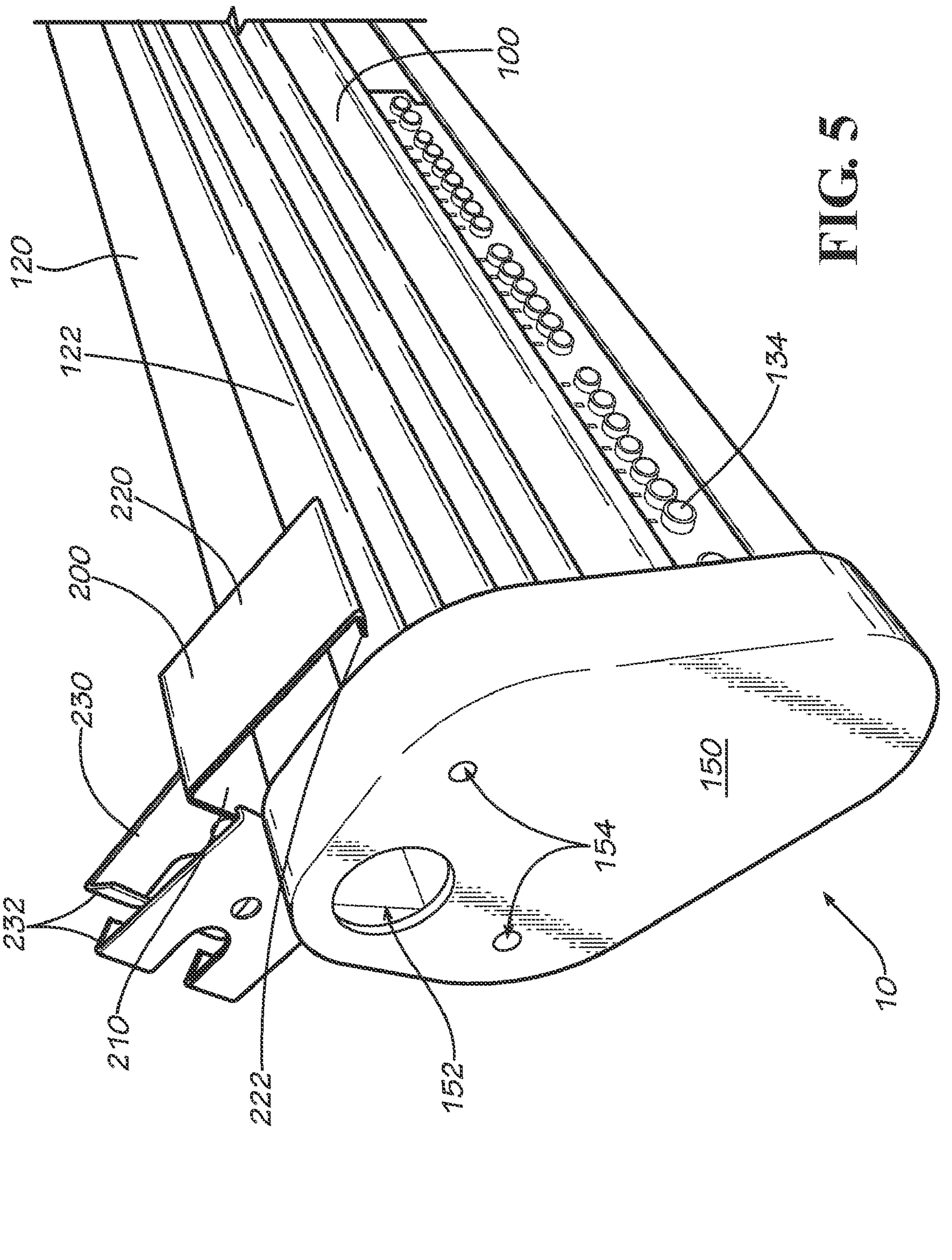
FIG. 5 is a partial perspective view of the light fixture of FIG. 1.
Figure 6:
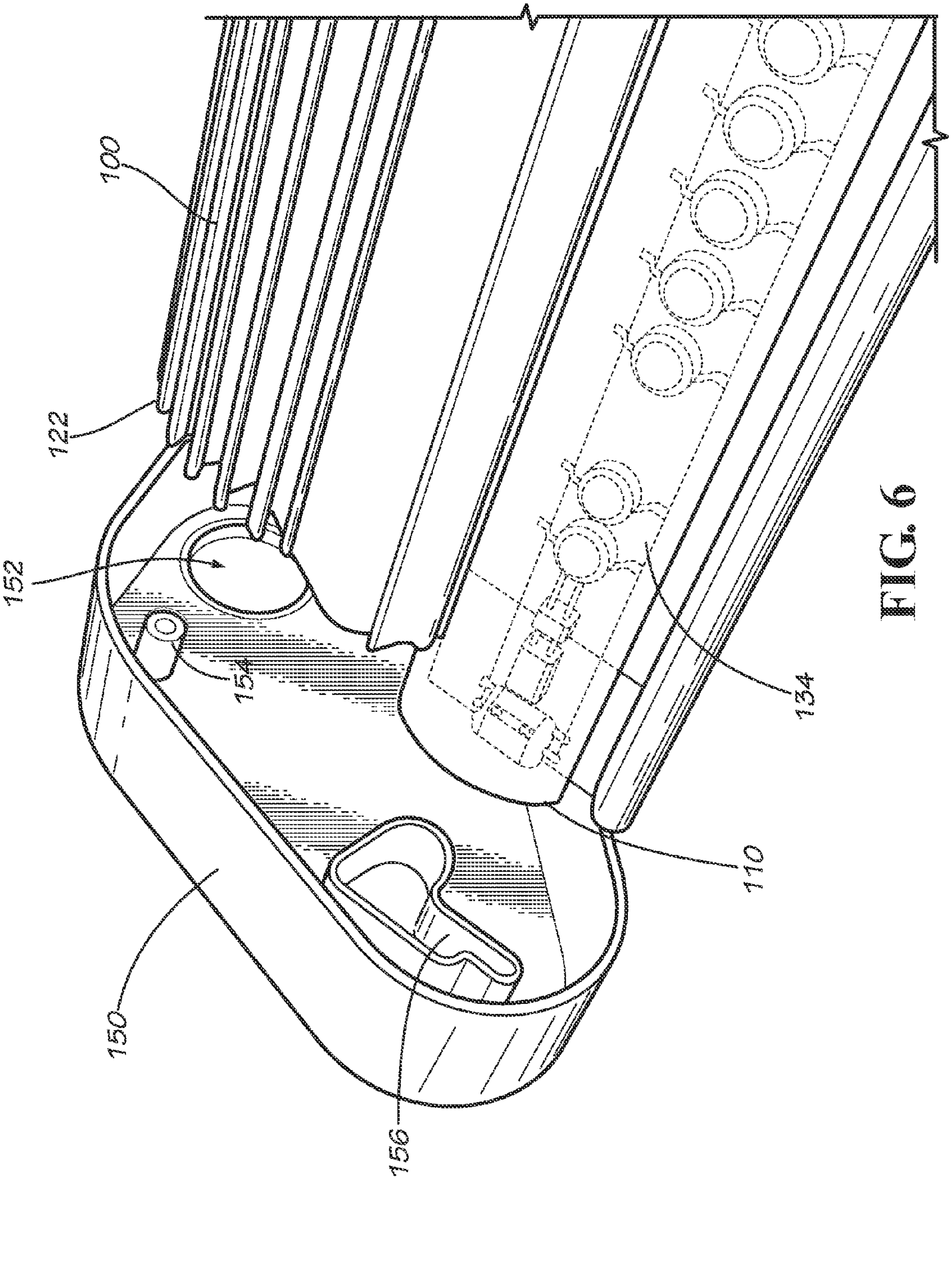
FIG. 6 is a partial perspective view of a cap and a housing of the light fixture of FIG. 1.
Figure 7:
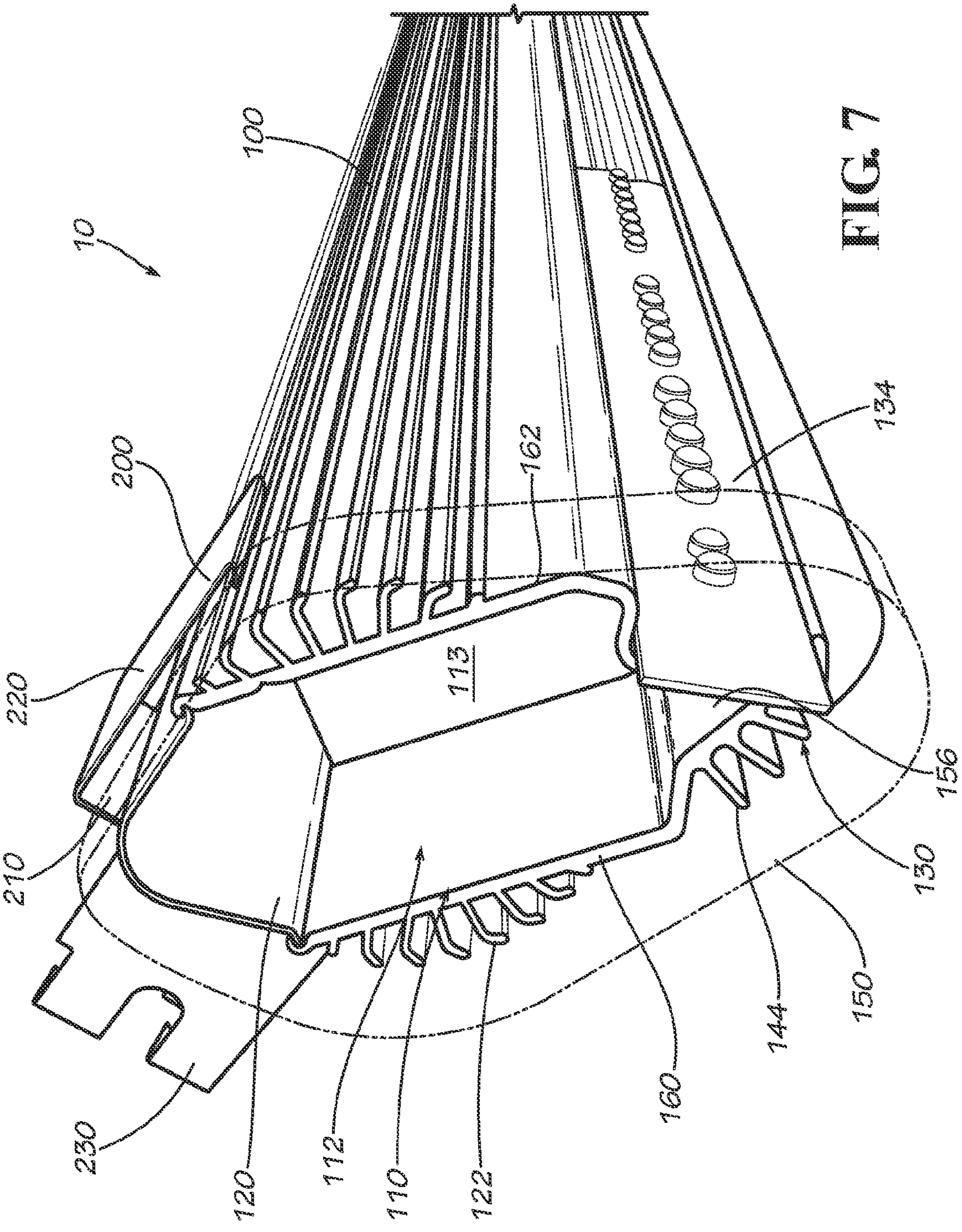
FIG. 7 is a transparent perspective view of the cap of FIG. 6.

As shown in FIGS. 5-7, the light fixture 10 may also include a cap 150 that is mounted on the ends of the housing 100. The cap 150 may include an aperture 152 through which any necessary connections (such as electrical connections with the power source 113) may be made. The cap 150 may be secured to the housing 100 by a variety of means, such as a friction fit, mechanical fasteners (bolts, screws, staples, etc.), or by a shaped notch 156 that engages with corresponding structure on the housing 100.

Figure 8:
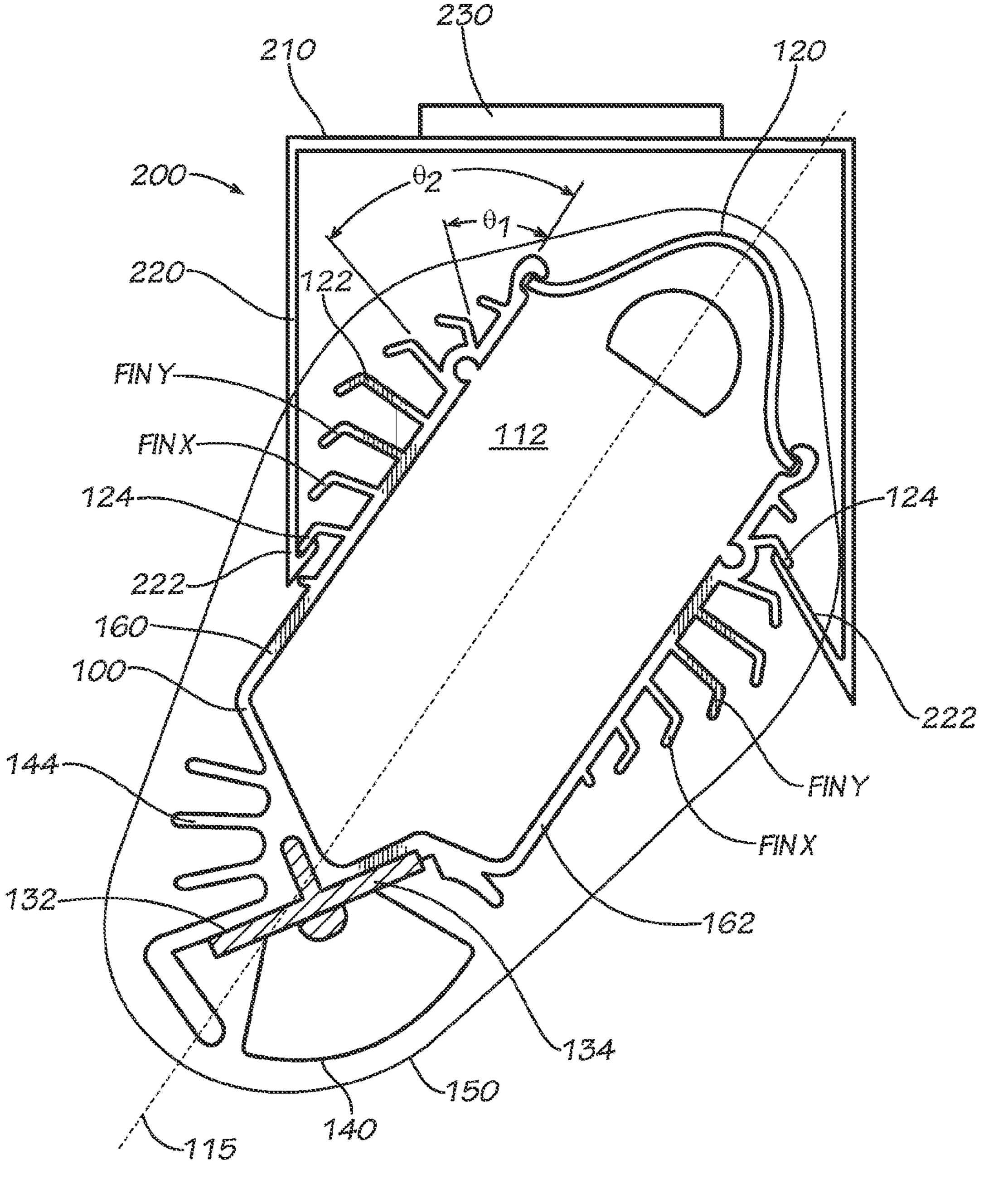
FIG. 8 is a cross-sectional view of the light fixture of FIG. 1.

In certain embodiments the light fixture 10 may be selectively positioned within a bracket 200 that is mounted to a surface, such as a wall or ceiling. There may be a single bracket 200 or multiple brackets 200, depending upon the size and shape of the light fixture 10. The bracket 200 may include a base portion 210 and retaining flanges 220 that extend from either edge of the base portion 210. The base portion 210 is sufficiently wide such that the light fixture 10 may be positioned within the bracket 200. The ends of the retaining flanges 220 may have upstanding arms 222. When the light fixture 10 is positioned within the bracket 200, a fin 122 rests on each of the upstanding arms 222 of the bracket 200. In other words, upstanding arms 222 contact and engage the underside of the fins 122 to thereby position and retain the light fixture 10 within the bracket 200. If desired, fins 122 may be provided with bent tips 124 (as shown in FIGS. 2 and 8) to facilitate engagement between the fins 122 and upstanding arms 222 and thus retention of the housing 100 on the bracket 200. But the bent tips 124 are not required. For example, FIGS. 9-11 show one embodiment of fins 122 without bent tips 124.

In FIG. 9, a first set of fins 122 are engaged with the upstanding arms 222 of the bracket 200 such that the light fixture 10 is oriented at angle α1, defined by the vertical 117 and the center plane 115 of the housing 100. In FIG. 10, a different set of fins 122 are engaged such that the center plane 115 of the housing is generally coincident with the vertical 117. And in FIG. 11, still another set of fins 122 are engaged such that the light fixture 10 is oriented at angle α2 (defined by the vertical 117 and the center plane 115 of the housing 100). It should be understood that the engaged fins 122 in FIGS. 9-11 do not necessarily correspond to matching sets of fins 122 as between the first and second sidewalls 160, 162. In other words, fin X on the first sidewall 160 and fin Y on the second sidewall 162 might be engaged with the upstanding arms 222 of the bracket 200. It thus is not necessary for the same fin X on both sidewalls 160, 162 to engage with upstanding arms 222 at the same time. The fins 122 allow for the housing 100 to be selectively positioned in a number of different orientations (such as α1 and α2), creating a number of light distribution options for the light fixture 10. The orientation of the light fixture 10 (such as α1, α2, and α3) may depend on the orientation of the fins 122 from the sidewalls 160, 162 (such as θ1 and θ2). Additionally, the orientation of the light fixture 10 may depend on the number of fins 122 provided on the housing 100.

The bracket 200 may also include mounting means 230 to mount the light fixture 10 to a surface. Mounting means 230 may extend from the base portion 210 in the opposite direction of the retaining flanges 220. The mounting means 230 may vary depending on the particular surface upon which the light fixture 10 is to be mounted. In the embodiment shown in FIG. 3, the mounting means 230 includes flanges 232 that may interact with the underside of a wire shelf. In other embodiments, the mounting means 230 may include hooks, fastening apertures, spikes, and/or anchors.

The foregoing is provided for purposes of illustration and disclosure of embodiments of the invention. It will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A light fixture comprising:

a housing comprising a first side wall, a first set of fins protruding from the first side wall, a second side wall, a second set of fins protruding from the second side wall, and a trough;

a light source positioned in the trough of the housing; and a bracket to receive the housing, the bracket comprising a first flange and a second flange, wherein, when the first flange engages a first fin of the first set of fins and the second flange engages a first fin of the second set of fins, the housing is positioned at a first orientation within the bracket and wherein when the first flange engages a second fin of the first set of fins and the second flange engages a second fin of the second set of fins, the housing is positioned at a second orientation within the bracket.

2. A light fixture as in claim 1, wherein the housing comprises a heat-conducive material comprising aluminum, copper, steel, or nickel.

3. A light fixture as in claim 1, wherein the first flange comprises an upstanding arm and wherein the upstanding arm engages the first fin of the first set of fins.

4. A light fixture as in claim 1, wherein the first fin of the first set of fins extends at a first angle from the first side wall and the second fin of the first set of fins extends at a second angle from the first side wall, wherein the first angle and the second angle are different.

5. A light fixture as in claim 1, wherein the first fin of the first set of fins extends at a first angle from the first side wall and the first fin of the second set of fins extends at a second angle from the second side wall, wherein the first angle and the second angle are different.

6. A light fixture as in claim 1, wherein the first fin of the first set of fins extends at a first angle from the first side wall and the first fin of the second set of fins extends at a second angle from the second side wall, wherein the first angle and the second angle are the same.

7. A light fixture as in claim 1, wherein the housing further comprises a channel between the first side wall and the second side wall.

8. A light fixture as in claim 7, wherein the light fixture further comprises a cover coupled to the housing and positioned at least partially over the channel.

9. A light fixture as in claim 1, wherein the housing further comprises a first end and a second end and a cap positioned on each of the first end and the second end.

10. A light fixture as in claim 1, further comprising an optic coupled to the trough of the housing such that the optic at least partially covers the light source.

11. A light fixture as in claim 1, wherein the light source comprises at least one of a fluorescent lamp, an electrodeless high-intensity discharge lamp, an incandescent light bulb, or one or more light-emitting diodes.

12. A light fixture as in claim 1, further comprising a third set of fins protruding from the housing adjacent the trough.

13. A light fixture as in claim 1, wherein the bracket further comprises mounting means to mount the light fixture to a surface.

14. A light fixture comprising:

a housing comprising a first side wall, a first set of fins protruding from the first side wall, a second side wall, a second set of fins protruding from the second side wall, and a trough;

a light source positioned in the trough of the housing, wherein the light source comprises a plurality of light-emitting diodes; and a bracket to receive the housing, the bracket comprising a first flange and a second flange, wherein the housing may be positioned within the bracket in a first orientation and a second orientation, and wherein, when the housing is in the first orientation, a first fin of the first set of fins engages with the first flange of the bracket, and a first fin of the second set of fins engages with the second flange of the bracket, and wherein, when the housing is in the second orientation, a second fin of the first set of fins engages with the first flange of the bracket, and a second fin of the second set of fins engages with the second flange of the bracket.

15. A method for selectively positioning a light fixture, the light fixture comprising:

a housing comprising a first side wall, a first set of fins protruding from the first side wall, a second side wall, a second set of fins protruding from the second side wall, and a trough;

a light source positioned in the trough of the housing; and a bracket comprising a first flange and a second flange, and the method comprising:

positioning the housing within the bracket at a first orientation such that the first flange engages a first fin of the first set of fins and the second flange engages a first fin of the second set of fins; and positioning the housing within the bracket at a second orientation such that the first flange engages a second fin of the first set of fins and the second flange engages a second fin of the second set of fins, wherein the first orientation is different than the second orientation.

16. A method as in claim 15, wherein the bracket further comprises mounting means, and the method further comprises mounting the bracket to a surface using the mounting means.

17. A method as in claim 15, wherein the housing further comprises a channel between the first side wall and the second side wall, and the method further comprises positioning a power source within the channel.

18. A method as in claim 15, wherein the light source comprises at least one of a fluorescent lamp, an electrodeless high-intensity discharge lamp, an incandescent light bulb, or one or more light-emitting diodes. bulb, or one or more light-emitting diodes.

* * * * *